United States Patent [19]

Jablin

[11] 4,061,531

[45] Dec. 6, 1977

[54] COKE OVEN GAS CONTACT WITH LIQUOR CONCENTRATE

[76] Inventor: Richard Jablin, P.O. Box 514, Winchester, Va. 22601

[21] Appl. No.: 640,331

[22] Filed: Dec. 12, 1975

[51] Int. Cl.² .................... B01D 1/00; B01D 1/16
[52] U.S. Cl. .................. 159/48 L; 159/4 CC; 159/4 K; 62/17
[58] Field of Search ............ 203/DIG. 8, 10, 22, 203/42, 48; 159/4 A, 48 L, 31, 4 K, 4 CL, 40 M, 13 C, 47 R, 47 WL; 62/17; 55/89, 94; 202/254

[56] References Cited

U.S. PATENT DOCUMENTS

| | | | |
|---|---|---|---|
| 2,040,097 | 5/1936 | Miller | 159/4 A |
| 2,838,135 | 6/1958 | Pilo et al. | 159/48 L |
| 3,153,609 | 10/1964 | Markant et al. | 159/4 A |
| 3,203,874 | 8/1965 | Somerville | 203/42 X |
| 3,312,749 | 4/1967 | Hess et al. | 55/89 X |
| 3,418,338 | 12/1968 | Gilman et al. | 203/42 X |
| 3,518,812 | 7/1970 | Kolm | 55/89 |
| 3,541,761 | 11/1970 | Pike | 55/89 |
| 3,638,708 | 2/1972 | Farin | 159/4 A |
| 3,880,617 | 4/1975 | Shibuya et al. | 55/94 |
| 3,927,153 | 12/1975 | Tarhan | 55/89 |
| 3,956,061 | 5/1976 | Young et al. | 159/4 CC |

Primary Examiner—Norman Yudkoff
Assistant Examiner—Barry I. Hollander
Attorney, Agent, or Firm—Finnegan, Henderson, Farabow & Garrett

[57] ABSTRACT

A waste liquor treatment system comprising an evaporator in combination with a gas cooler, said evaporator providing fractional distillation of waste liquor, thereby separating the liquor into its several components of gaseous vapors, purified water and concentrated brine and said gas cooler providing thermal energy from its waste heat to run the evaporator. The evaporator consists of a boiler section, a condenser section, a vacuum pump, a liquor circulating pump and nozzles for extracting the products. The gas cooler may be one or two stage. In the one stage cooler, the hot liquor which condenses in the gas cooling process provides energy for the evaporator through means of a heat exchanger. In the two stage gas cooler, the hot liquor in the first stage is circulated directly to the boiler section of the evaporator. The hot liquor from the second stage is circulated through a separate heat exchanger.

7 Claims, 3 Drawing Figures

COKE OVEN GAS CONTACT WITH LIQUOR CONCENTRATE

DISCLOSURE OF INVENTION

The present invention relates to the treatment of waste liquor by a system which uses the heat that is normally wasted from the cooling of industrial process gas, such as coke oven gas, to provide energy for the fractional evaporation of the liquor which condenses from the gas.

A purpose of the invention is to separate the components of gaseous vapors, purified water and concentrated brine from waste liquors which condense from the cooling of industrial process gas, so that the components may be utilized or treated in an efficient manner.

A further purpose is to separate the components of gaseous vapors, purified water and concentrated brine from waste liquors which condense from the cooling of industrial process gas and to utilize the heat from the cooling of said gas to provide the energy for separating the components from the liquor.

A further purpose of the invention is to separate the components of gaseous vapors, purified water and concentrated brine from the waste ammoniacal liquor which condenses in the primary gas coolers of a coke oven gas by-product plant so that the components may be used or treated in an efficient manner and to do so utilizing the thermal energy which is normally wasted from the primary gas coolers.

A further purpose of the invention is to provide a system for separating the components of gaseous vapors, purified water and concentrated brine from waster liquors in which the principal mechanism of heat transfer to or from the foul gas or foul liquor is by direct contact, thereby avoiding corrosion and fouling of heat exchange surfaces.

A further purpose of the invention is to provide a system for separating the components of gaseous vapors, purified water and brine from waste liquors in which the salt in the brine is crystalized and withdrawn from the brine in the crystal form.

In the drawings, I have chosen to illustrate three of the numerous embodiments in which the invention may appear, selecting the forms shown from the standpoints of convenience in illustration, satisfactory operation and clear demonstration of the principles involved.

Figure 1:
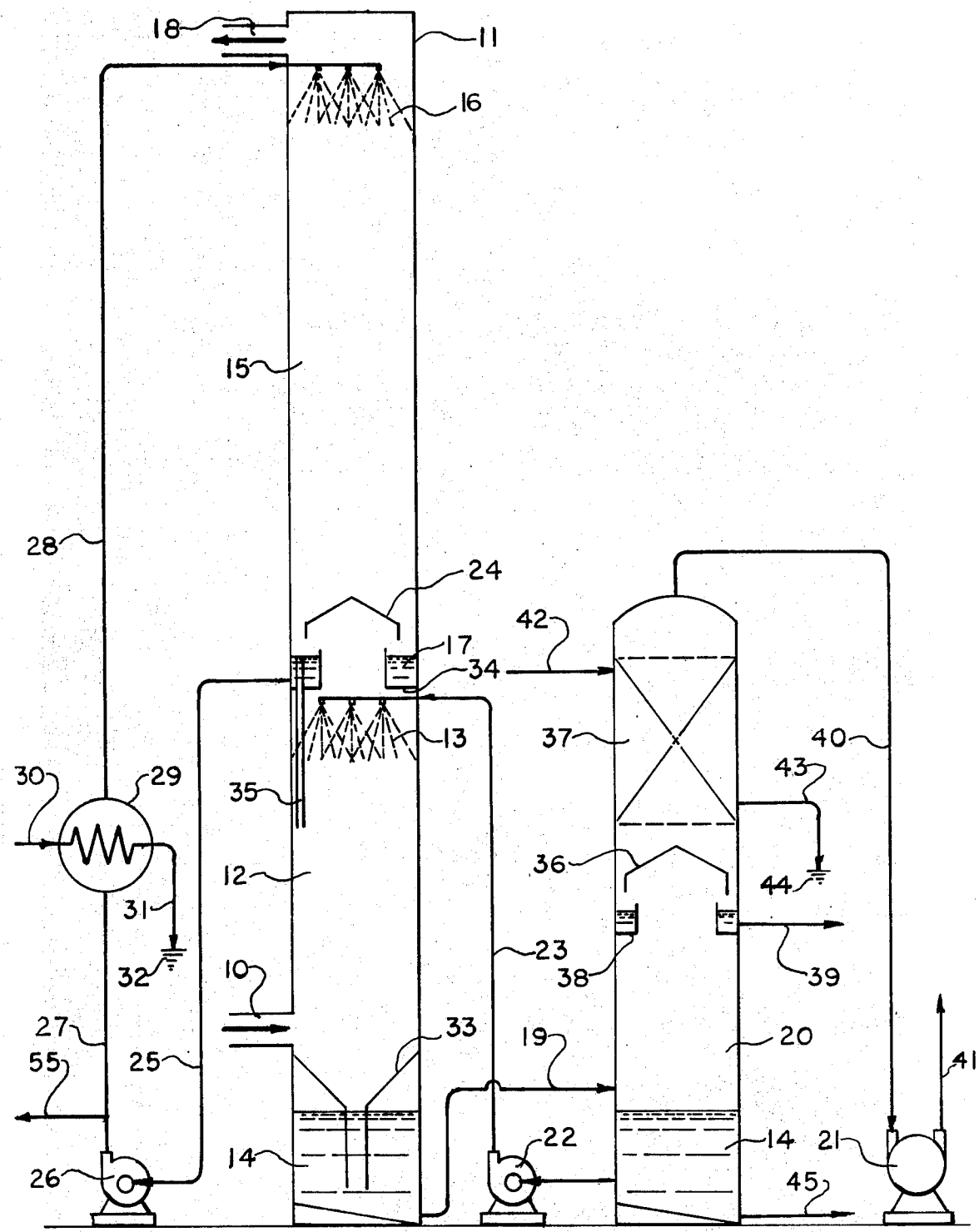
FIG. 1 is a diagrammatic general arrangement and process flow sheet of the invention in which a two stage gas cooler is used.

In the prior art the treatment of waste liquors, which condense from the cooling of industrial process gas has been inadequate in that the product was not environmentally suitable for discharge to the waterways of the nation. Furthermore, the process of treating the liquors consumed valuable chemicals and gave rise to sludges which created a solid-waste disposal problem.

In an effort to overcome the inadequate treatment, to avoid the purchase of valuable chemicals and to obviate the need for sludge disposal, a prior process was developed to fractionally distill the waste into components of gaseous vapors, purified liquor and concentrated brine.

The process achieved its objectives; however, it consumed a large amount of energy and contained a substantial area of heat exchange surfaces which are subject to fouling and corrosion, thereby shutting down the process at frequent intervals.

The prior art will be discussed below in specific relationship to coke oven gas technology. However, it is also applicable to other process gas technology.

Coke is made by the destructive distillation of coal in the absence of air. The heating process, which attains temperatures as high as 2000° F. drives off both the surface water and the water of combination from the coal. Cooling of the gas, which evolves from the heated coal, takes place by means of sprays in the gas collecting mains. The non-condensed gas and vapors leaving the mains, at a temperature of 160° to 180° F. require further cooling to approximately 95° F. This further cooling takes place in a gas cooler, known as a primary gas cooler. The purpose of the further cooling is to remove tar vapors and a major portion of the water vapor and to reduce both the volume and temperature of the gas before its admission to the exhauster which draws the gas from the coke ovens. The vapors which condense are known as waste ammoniacal liquor.

There are two types of primary coolers. One is the direct primary cooler in which heat transfer takes place by direct contact between the gas and the previously condensed, separately cooled waste liquor. In the indirect primary cooler, heat exchange takes place through the medium of tubing.

Waste ammoniacal liquor is usually discharged to a receiving body of water such as a river or a lake. Its usual flow is 15 to 35 gallons per ton of coal which is charged into the coke ovens. It is highly toxic and must be treated before it is environmentally acceptable for discharge.

The composition of waste ammoniacal liquor varies, depending on the nature of the coal from which it is derived, the type of coke oven that is used, and the coking temperature. A typical range of composition expressed in milligrams per liter is listed below:

Phenolics: 300 to 4000;
Free ammonia (separable by steaming): 1300 to 2000;
Fixed ammonia (requires chemicals for its separation): 2600 to 4000;
Carbonate: 2300 to 2600;
Cyanide: 10 10 to 100;
Thiocyanate: 50 to 500;
Total dissolved solids: 4000 to 130000.

The most common method of treating waste ammoniacal liquor for discharge is to pass it through a free still, a fixed still and an activated sludge plant. The free still causes the evolution of free ammonia and certain acidic gases due to direct contact with live steam. The fixed still causes the evolution of fixed ammonia due to the addition of a basic chemical compound such as lime or sodium hydroxide and further direct contact with live steam. The activated sludge plant removes nearly all the phenolics and 25 to 60 percent of the cyanide and thiocyanate.

A well-operated plant, such as the one just described, will produce an effluent containing less than 1 milligram per liter of phenolics and acceptable levels of ammonia. However, the content of cyanide and thiocyanate will be above the toxic limits and the level of total dissolved solids will be essentially undiminished. The color of the liquid will be dark brown and will taste bad. It will also be necessary to provide an environmentally acceptable land area for receiving the lime sludge from the fixed still as well as the biological sludge from the activated sludge plant.

A newer process has been recently developed to provide a better quality effluent and to avoid, in part, the problem of disposing of the sludge. The central unit in this process is a free ammonia still combined with a multiple effect evaporator. Three effluents are produced. The first is gaseous vapors consisting of ammonia, certain acidic gases and water vapor. These are incinerated and pass to the atmosphere in an environmentally acceptable manner. The second is purified water which contains most of the phenolics, the reason for the lack of separation being that the boiling points of water and the phenolics are close to one another. The phenolics are further treated by an activated sludge plant, or extracted as a usable by-product. The third is concentrated brine which contains the fixed ammonia, cyanide, thiocyanate and other dissolved solids. This is incinerated and, in a scrubber unit which is incorporated with the incinerator, recovered as a useful acid. The composition of the acid is principally hydrochloric acid and contains a small percentage of sulpuric acid. Incineration of the raw, dilute waste liquor was also tried, but it required an excessive amount of energy.

The newer process has produced an environmentally acceptable effluent as well as a usable acid. It has two disadvantages. The first is that of fouling and corrosion on the heat exchange surfaces. This occured despite the fact that the waste ammoniacal liquor was decanted and then filtered before admitting it for treatment and despite the refractory material that was used for the heat exchange tubing, titanium having been the material of choice. Plant shut-downs to correct the results of the fouling and corrosion have been frequent. The second is that of high consumption of energy which is required for distillation, despite the employment of multiple effects to achieve maximum conservation of energy.

I have discovered that the heat which is removed from the coke oven gas in the primary cooler is somewhat greater than the thermal energy which is required in the single stage evaporation of the waste ammoniacal liquor, and that it is possible to operate the gas cooler and evaporator together in a common, efficient and reliable system.

In accordance with the invention, the coke oven gas is cooled in the primary cooler by direct contact between spray droplets of waste ammoniacal liquor and the hot gas. The heated liquor is then circulated through a single stage evaporator which is operated at a partial vacuum. The liquor boils in the vacuum, thereby cooling it for return to the primary cooler. Cooling coils in the evaporator condense the purified water. A vacuum pump draws off the uncondensed vapors.

The evaporation of water from the waste ammoniacal liquor causes the latter to increase its content of dissolved solids. When the concentration of dissolved solids reaches approximately 25 percent, brine is extracted. The extraction flow rate of the brine is set at such an amount as to maintain the concentration of the dissolved solids as high as is practicable.

While it is evident that the invention will normally be applied to the treatment of ammoniacal waste liquor from a by-product coke plant, it will also be evident that the invention can be applied to liquor which condenses from the cooling of any industrial process gas.

First considering FIG. 1, coke oven gas from the collecting mains of the coke oven enters the inlet nozzle 10 of the two stage primary gas cooler 11. In the first stage 12 of the primary gas cooler 11, the gas is cooled by sprays 13 of brine 14. In the second stage 15, the gas is further cooled by sprays 16 of condensed liquor 17. The cooled coke oven gas leaves the primary gas cooler 11 through the outlet nozzle 18.

The brine 14 flows through pipe 19 to the evaporator 20 which is maintained at a partial vacuum by means of vacuum pump 21. Flow through the pipe is created by the differential in pressure between the gas cooler which is at nearly atmospheric pressure and the evaporator which is a strong partial vacuum. The brine 14 boils inside the evaporator and, in so doing, becomes cooled to a temperature equivalent to the vapor pressure which approaches the absolute pressure of the evaporator. The brine pump 22 recirculates the brine to the sprays 13 by means of pipe 23.

The partially cooled gas from the first stage 12 of the primary gas cooler passes upward around a separating hat 24 into the second stage 15. The separating hat prevents the free flow of condensed liquor 17 from the second stage to the first stage. The condensed liquor flows through a pipe 25 to a liquor pump 26 which recirculates it to sprays 16 through pipes 27 and 28, and heat exchanger 29. In the heat exchanger, the liquor is cooled by water which flows from pipe 30 and discharges to drain 32 via pipe 31.

During the cooling of the coke oven gas in the primary gas cooler 11, a major portion of tar vapors, water vapors and other condensibles is removed from the gas. Most of the removal takes place in the first stage 12 where the condensibles pass directly into the brine 14 through the drain cone 33. The condensibles in the second stage mix with the recirculated liquor, thereby adding to its volume. Excess liquor overflows from the basin 34 through the overflow pipe 35 to the first stage where it becomes added to the brine 14.

In the evaporator 20, the vapors from the brine pass around the separating hat 36 to the condenser 37 where the majority of the vapors condense, fall into basin 38 and are extracted through pipe 39. The uncondensed vapors leave the top of the evaporator and go to vacuum pump 21 via pipe 40 and from the vacuum pump via pipe 41. Water flows to the condensor 37 from pipe 42 and from the condenser to the drain 44 via pipe 43.

Brine is extracted from the bottom of the evaporator by means of pipe 45. The rate of extraction is set to maintain the desired level of concentration of dissolved solids in the recirculated brine. The partial vacuum in the evaporator 20 as well as the flow of cooling water to the condenser 37 are set to maintain a desired rate of evaporation which, in turn, affects the level of liquid in the basin of the evaporator. If the level of brine in the basin rises above the desired setting, the partial vacuum is increased, (the absolute pressure is decreased), and the water flow to the condenser is increased, thereby increasing the rate of evaporation. Reverse actions are required to correct a brine level which is too low.

There are two heat transfer units, the heat exchanger 29 and the condenser 37. In the heat exchanger 29, the heat transfer surfaces contact water on one side and the dilute liquor on the other side. In the condenser 37, the heat transfer surfaces contact water on one side and a dilute solution of phenolics in water on the other side. Experience has shown that fouling of these surfaces is not a serious problem and that a wide variety of materials, the 316 grade of stainless steel being one such, will provide corrosion-free service.

Figure 2:
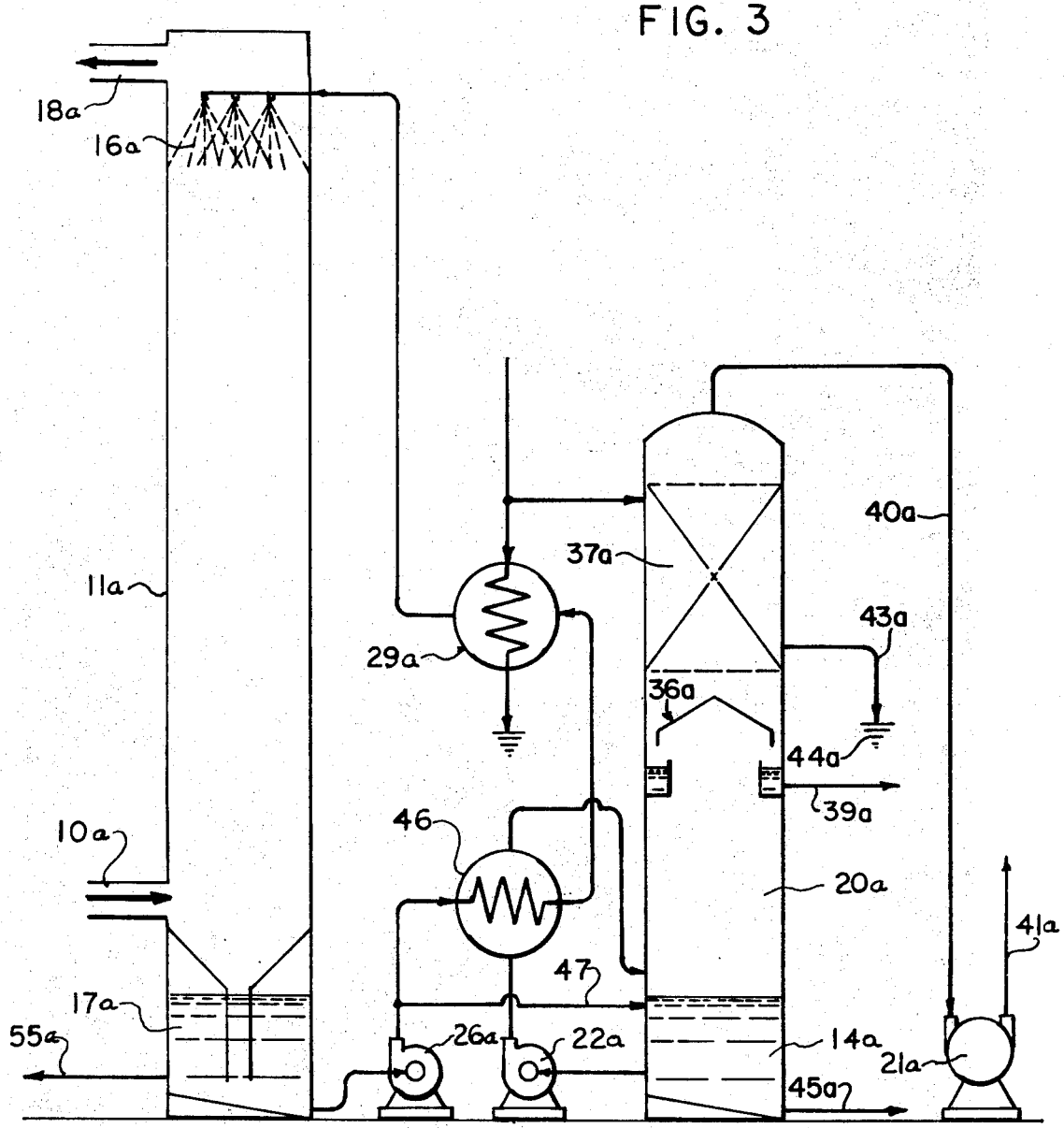
FIG. 2 is a diagrammatic general arrangement and process flow sheet in which a one stage gas cooler is used.

In FIG. 2, the primary gas cooler 11a is one stage and a brine heater 46 is placed in series with the heat exchanger. The gas enters the gas cooler through inlet nozzle 10a and leaves through outlet nozzle 18a. Condensed liquor 17a is circulated to the liquor sprays 16a by the liquor pump 26a through the brine heater 46 where it is cooled by the brine 14a and the heat exchanger 29a where it is further cooled by water. In the brine heater 46, the brine 14a is heated for recirculation to the evaporator.

The vapors which condense in the primary gas cooler 11a mix with and add to the quantity of the recirculated liquor 17a. Pipe 47 extracts liquor from the recirculated liquor system and introduces it to the basin of the evaporator 20a. The rate of extraction is set to maintain the desired level of liquid in the basin of the primary gas cooler.

All functions, constructions and operations of other equipment such as the evaporator, condenser 37a, separating hat 36a, the pumps lines 39a, 40a, 43a, 45a, and so forth, are the same as described above and in FIG. 1 and their description will not be repeated.

The arrangement of FIG. 2 is advantageous compared to the arrangement of FIG. 1 in respect to the primary gas cooler. The one stage primary gas cooler 11a is smaller, of simpler construction and, because it is not exposed to the brine 14a, may be of carbon steel as compared to the larger, more complex two stage primary gas cooler 11, which must have a higher grade of material such as grade 316 stainless steel where there is contact by the brine 14. For these reasons, the former primary gas cooler is less expensive than the latter for a given capacity. There is an additional advantage in that the one stage, direct-contact, primary gas cooler presently exists in many by-product coke oven plants, thereby permitting the creation of the treatment facility by the addition of the evaporator 20a, the brine heater 46, the vacuum pump 21a, and so forth.

The arrangement of FIG. 2 is disadvantageous compared to the arrangement of FIG. 1 in respect to the brine heater 46. The brine heater 46 is exposed to the foul, highly concentrated brine 14a and careful attention must be given to various facets of design to prevent fouling and corrosion. To minimize fouling, the velocity of brine in the tubes must be high; nevertheless, provisions must be included for mechanical and steam cleaning, as well as the provision of standby heaters, to insure continuity of service. To avoid corrosion, the tubes must be made of titanium or a similarly refractory material. Titanium will be satisfactory because the temperatures are well below 200° F.

In an existing by-product coke plant which has one or more direct-contact, primary gas coolers, the arrangement of FIG. 2 will doubtless be preferred. In other instances, the arrangement of FIG. 1 would be the more advantageous.

The gaseous vapors 41 and 41a contain about 10 percent ammonia and about 90 percent water vapor with the minor addition of certain acidic gases. The vapors may be incinerated in an environmentally acceptable manner or the ammonia may be recovered as a useful by-product. Both are feasible and have been demonstrated commercially.

The dilute solution of phenolics in purified water 39 and 39a may be introduced into an activated sludge plant for the purpose of destroying the phenolics, into a bed of activated carbon for the purpose of adsorbing the phenolics, or into a phenol recovery unit for the purpose of obtaining a useful by-product of phenolics. All three are feasible and have been demonstrated commercially.

The brine 14 and 14a contains the dissolved solids in a solution of approximately 25 percent concentration together with condensed tar. The brine may be delivered to a liquid incinerator which consumes the tar and converts the salts to acidic gases. A scrubber and absorber is associated with the incinerator. They cool the gas and produce a useful acid by-product in which the major constituent is hydrochloric acid and the minor is sulphuric acid. One use of the acid is in the pickling of steel for the purpose of providing a clean, oxide-free surface. The liquid incinerator has been demonstrated commercially.

Figure 3:
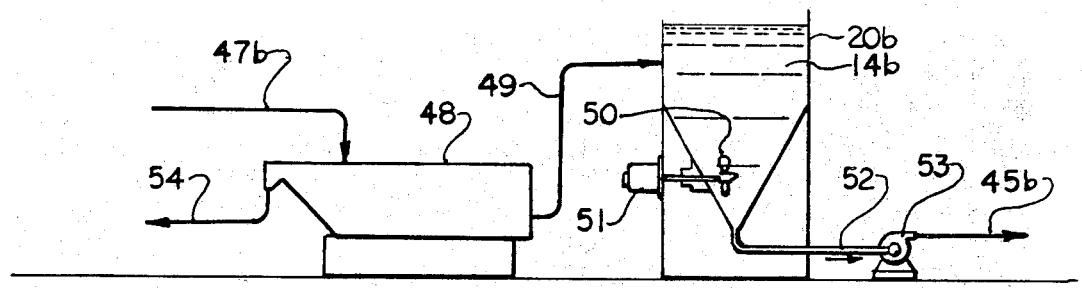
FIG. 3 is a partial diagrammatic general arrangement and process flow sheet in which the bottom of the evaporator is fitted for the production of salt crystals.

Another use for the brine is to produce it in the crystalline form, free of tar. Because the dissolved solids contain ammonium chloride in a high ratio, approximately 85 percent by weight, the crystals are useful, one such use being as fertilizer. FIG. 3 shows a partial arrangement and process flow sheet for separating the tar and producing the crystals.

In FIG. 3, the liquor comes from the primary gas cooler through pipe 47b. The liquor first enters the decanter 48 where the tar is separated from the liquor, the tar being extracted through pipe 54 and the liquor being delivered to the evaporator 20b through pipe 49. The concentration of dissolved solids of the brine 14b in the evaporator 20b is maintained at a high level, approximately 50 percent, such that the cooling of the brine solution causes the formation of salt crystals. The agitator 50 is driven by motor 51 to keep the crystals in suspension. The slurry pump 53 draws the mixture of brine and crystals from the bottom of the evaporator through pipe 52 and delivers the mixture through pipe 45b to commercially available equipment for dewatering, drying and storing the crystals. The brine which is removed from the crystals during dewatering is returned to the evaporator 20b. It is evident that the production of salt crystals is equally applicable to the arrangement which employs a one stage primary cooler as to that which employs a two stage primary cooler.

In FIG. 1, pipe 55 is used to extract a quantity of condensed liquor 17 from the liquor circulating system. The extracted liquor is used for two purposes. One is to provide make-up flow to the flushing liquor system of the coke oven gas collecting mains. The other is to provide nutrients for the biological mass in the activated sludge plant. The flow of condensed liquor 17 to the brine 14 is reduced by the amount of liquor that is extracted through pipe 55. In FIG. 2, pipe 55a serves the same purpose of extracting the condensed liquor.

Various types of equipment may be substituted for the equipment which is shown in the drawings and described above. For example, an ejector may be employed in place of the vacuum pump 21, recirculation from the slurry pump 53 to the evaporator 20 may be employed to obviate the need for the agitator 50, and so forth. In view of my invention and disclosure, variations and modifications to meet individual whim or particular need will doubtless become evident to others skilled in the art, to obtain all or part of the benefits of my invention without copying the apparatus or process shown, and I therefore claim all such insofar as they fall within the reasonable spirit and scope of my claims.

Having thus described my invention, what I claim as new and desire to secure by Letters Patent is:

1. A process of separating coke oven gas derived from the destructive distillation of coal in a coke oven into its components without addition of external heat comprising:
   a. feeding said gas directly from the coke oven to a primary cooler,
   b. directly contacting said gas in said cooler with a liquor, derived from step (j) hereinbelow, to cool said gas, to transfer components from said gas to the liquor, and to heat said liquor,
   c. withdrawing cooled gas containing remaining components as the overhead from said primary cooler,
   d. passing at least a portion of said heated liquor from said cooler directly to an evaporator without addition of further heat to said heated liquor,
   e. applying a vacuum to said liquor in said evaporator to boil said liquor and form a cooled concentrated brine and a vapor without addition of heat,
   f. condensing a portion of said vapor in an indirect condenser to form a condensate and separately withdrawing said condensate and said uncondensed vapors,
   g. withdrawing a portion of said brine as concentrated produce,
   h. passing at least a portion of said heated liquor from said cooler to an indirect heat exchanger,
   i. removing heat from said heated liquor in said heat exchanger to cool said liquor passed thereto, and
   j. feeding said cooled liquor from step (i) to said primary cooler for use in step (b).

2. The process of claim 1, wherein said primary cooler consists of a single stage, further comprising passing at least a portion of said heated liquor and at least a portion of said brine into indirect heat exchange to heat said brine and cool said heated liquor.

3. The process of claim 2, wherein said primary cooler is made of carbon steel.

4. The process of claim 1, wherein said components removed from said gas in step (b) include tar vapors and water vapor.

5. The process of claim 1, wherein said condensate is a dilute solution of phenolics in water.

6. The process of claim 1, wherein said uncondensed vapors comprise about 10% ammonia, about 90% water vapor, and acidic gases.

7. The process of claim 1, wherein said brine comprises condensed tar and dissolved ammonium chloride.

* * * * *

UNITED STATES PATENT AND TRADEMARK OFFICE
CERTIFICATE OF CORRECTION

PATENT NO. : 4,061,531
DATED : December 6, 1977
INVENTOR(S) : RICHARD JABLIN

It is certified that error appears in the above-identified patent and that said Letters Patent are hereby corrected as shown below:

Claim 1, column 8, line 2, change "produce" to --product--.

Signed and Sealed this

Twenty-first Day of March 1978

[SEAL]

Attest:

RUTH C. MASON
Attesting Officer

LUTRELLE F. PARKER
Acting Commissioner of Patents and Trademarks